(12) United States Patent
Kennedy et al.

(10) Patent No.: US 11,280,911 B2
(45) Date of Patent: Mar. 22, 2022

(54) SYSTEM AND METHOD FOR SYNTHETIC APERTURE BASED POSITION, NAVIGATION, AND TIMING

(71) Applicant: Echo Ridge LLC, Sterling, VA (US)

(72) Inventors: Joseph P. Kennedy, Great Falls, VA (US); John P. Carlson, Dulles, VA (US); Martin Alles, Great Falls, VA (US)

(73) Assignee: Echo Ridge, LLC, Great Falls, VA (US)

( * ) Notice: Subject to any disclaimer, the term of this patent is extended or adjusted under 35 U.S.C. 154(b) by 68 days.

(21) Appl. No.: 16/586,143

(22) Filed: Sep. 27, 2019

(65) Prior Publication Data
US 2020/0278452 A1 Sep. 3, 2020

Related U.S. Application Data

(60) Provisional application No. 62/738,505, filed on Sep. 28, 2018.

(51) Int. Cl.
*G01S 19/07* (2010.01)
*G01S 19/30* (2010.01)

(52) U.S. Cl.
CPC .............. *G01S 19/07* (2013.01); *G01S 19/30* (2013.01)

(58) Field of Classification Search
CPC .......... G01S 19/07; G01S 19/30; G01S 19/32; G01S 19/24; G01S 19/14; H01Q 1/1257; G01C 15/00
USPC ......................................................... 342/352
See application file for complete search history.

(56) References Cited

U.S. PATENT DOCUMENTS

| 8,130,141 | B2 * | 3/2012 | Pattabiraman | .......... | G01S 19/46 |
| | | | | | 342/357.29 |
| 2019/0017828 | A1 * | 1/2019 | Harish | ...................... | G06F 3/14 |
| 2020/0064141 | A1 * | 2/2020 | Bell | ................... | G01C 21/3407 |

* cited by examiner

*Primary Examiner* — Harry K Liu
(74) *Attorney, Agent, or Firm* — Duane Morris LLP

(57) ABSTRACT

A system and method for estimating the position of a receiver and/or timing information for a receiver based on emissions from radio signal sources meant for applications other than position/navigation/time (PNT) estimation.

20 Claims, 5 Drawing Sheets

SYSTEM AND METHOD FOR SYNTHETIC APERTURE BASED POSITION, NAVIGATION, AND TIMING

The present disclosure is generally directed to estimating position of a receiver and/or timing information for a receiver based on emissions from radio signal sources meant for applications other than position/navigation/time (PNT) estimation. These type of signals are generally known as Signals of Opportunity (SoOPs). Specifically, the present disclosure is directed at estimating PNT information from SoOPs transmitted from fast moving RF sources such as low earth orbiting satellites (LEDs) constellations.

BACKGROUND

Determining PNT information for a receiver using satellite navigation systems such Global Positioning System (GPS) and Global Navigation Satellite System (GNSS) are well known. For example, GPS location of a receiver is based on maintaining accurate timing and the known position of transmitting GPS satellites. The satellites carry very stable clocks that are synchronized with one another and with ground clocks. Any drift of the satellite clocks from true time maintained on the ground is corrected daily. In the same manner, the satellite locations are known with great precision. On the other hand, GPS receivers on the ground have clocks as well, but they are less stable and less precise.

GPS satellites continuously transmit data about their current time and position. This information is known as ephemeris data and its use is critical for GPS receivers to determine its location in a timely manner. Because the receipt of ephemeris data from a satellite transmission requires time and processing resources, some navigation systems provide this ephemeris data separately from ground stations, sometimes referred to as assisted GPS information, in order to expedite the processing of the PNT information received from a satellite.

In general, a GPS receiver monitors multiple satellites and solves equations to determine the precise position of the receiver and the receiver's clock's deviation from true time. In prior art systems, at a minimum, four satellites must be in view of the receiver for it to compute four unknown quantities—three position coordinates (x,y,z) and receiver clock deviation from satellite time.

In operation, each GPS satellite continually broadcasts a signal that includes a pseudorandom code and ephemeris data. The pseudorandom code is known to the receiver and is used to determine the time of arrival (TOA) of a defined point in the pseudorandom code sequence. The ephemeris data includes the time of transmission (TOT) of the pseudorandom code and the satellite position at that time (according to the satellite clock).

The receiver measures the TOAs (according to its own clock) of four satellite signals. From the TOAs and the TOTs, the receiver forms four time of flight (TOF) values, which can then be used to determine the distance between the receiver and each of the satellites. The receiver can then compute its three-dimensional position (x,y,z) and its clock deviation from the satellite clocks.

While generally four satellites are required to be in "view" of the receiver to compute its three-dimensional position and clock deviation, there are circumstances where less satellites can be used to determine PNT information. For example, if the receiver uses a clock synchronized to the clocks used by the satellites, only three satellites are needed to compute a 3-dimensional position solution. However, a significant downside to this approach is that the cost and complexity of the receiver would increase significantly.

Another circumstance is where one variable is already known. For example, a receiver may have a known elevation and thus can determine its position using only three satellites. In addition, some receivers may use additional clues or assumptions such as reusing the last known altitude, dead reckoning or inertial navigation or including information from a vehicle computer, to give a (possibly degraded) position when fewer than four satellites are visible.

There are known problems with traditional navigation satellite systems. For a variety of reasons, environmental and otherwise, a receiver may not have access to four satellites. In addition, the receiver must have the capability to decode the navigation signals and have access to ephemeris data so that it knows the position of the satellites.

In one aspect, the present disclosure avoids these problems by relying on signals transmitted by SoOP communication satellites. SOops may include signals that (1) are broadcast be transmitters that do not broadcast their location, (2) may not include precision time keeping capability, or (3) may be emitted by a transmitter located on a terrestrial, air borne or space-based platform. The SoOP transmitter can be for any non-PNT purpose and can be owned or operated by any entity. Likewise, the hosting structure or platform for the transmitter can be owned or operated by any entity and can be terrestrial or extraterrestrial including satellites, aircraft, drones, etc.

In one embodiment, the present disclosure takes advantage of the new class of communication satellite constellations that have a low earth orbit (LEO). A typical LEO satellite orbits around earth at an altitude of 1,200 miles or less, and with an orbital period of between about 84 and 127 minutes. A low earth orbit is simplest and cheapest for satellite placement, and it provides high bandwidth and low communication time lag. However, LEO satellites are not geostationary—they are not visible from any given point on the Earth at all times—and therefore, a network or constellation of satellites is required to provide continuous coverage. On the other hand, a geostationary orbit requires that the satellite move at the same angular velocity as the earth.

Since it requires less energy to place a satellite into a low earth orbit and the LEO satellite needs less powerful amplifiers for successful transmission than geostationary satellites, LEO satellites are used for many communication applications.

In one recent application, a LEO satellite constellation is being developed to provided worldwide internet coverage. SpaceX has plans to launch 4,425 satellites into low-Earth orbits, with altitudes ranging from 715 miles to 823 miles. By contrast, the existing HughesNet satellite network has an altitude of 22,000 miles above the earth. SpaceX's plan for low orbits would greatly reduce latency. Current satellite internet systems suffer from high latency, meaning that data packets must travel great distances between earth and satellites, resulting in noticeable delays for internet users. SpaceX expects its own latencies to be between 25 and 35 ms, similar to the latencies measured for wired internet services. Current satellite internet service providers (ISP) have latencies of 600 ms or more. Each satellite will provide aggregate downlink capacity of 17 to 23 Gbps. When fully deployed, the system will add capacity and availability at the equator and poles for truly global coverage.

Likewise, another company, One Web has plans to deploy a constellation of 720 LEO satellites, all orbiting the earth at an altitude of roughly 745 miles to provide a nationwide satellite internet service to the U.S.

These planned LEO satellite constellations are intended for providing communications, mostly internet-based, and thus do not transmit signals for position/navigation/time (PNT) estimation. Thus, the emitted signals are SoOPs. A trade-off associated with the new LEO constellations is that reducing latency at lower orbits means that you need more satellites to ensure adequate cover for a specific spot on earth. In other words, each LEO satellite is "visible" for only a short period of time for a given geographic spot. At low-earth orbit, the satellites are moving very quickly around the globe rather than permanently pointing at one spot, as a geostationary satellite would.

Although not intended for PNT estimation, the transmitted LEO satellite signals can be used with the present disclosure to determine PNT information of a receiver of the satellite signals. In one aspect, the present disclosure exploits the motion of the satellites to form a synthetic aperture, which has the effect of virtually increasing the number of available emitters over time, thereby making PNT possible when few sources are available.

The present disclosure has application to providing PNT in regions where Global Position System (GPS), Global Navigation Satellite Systems (GNSS) or other satellite navigation system may not be available due to radio frequency (RF) interference or signal loss.

Although one embodiment of this disclosure is directed to fast moving LEO communications satellites, its teachings are equally applicable to other platforms that have a high rate of motion, including airplanes, drones and spacecraft.

In one aspect, the present disclosure provides a novel approach to addressing transmit time ambiguities that are known to exist in some communications networks.

In another aspect, the present disclosure provides a novel approach to compensate for the high rate of motion throughout each measurement interval through a time-warped ambiguity function.

In yet another aspect, the present disclosure provides a novel approach to performing PNT calculations with as few as two emitters using an extended time weighted fitting technique.

In still another aspect, the present disclosure provides a novel approach to performing navigation without decoding broadcast data from the signal.

In yet still another aspect, the present disclosure provides a novel approach to providing high accuracy PNT information using primarily time of arrival measurements, and not Doppler measurements.

DETAILED DESCRIPTION

Figure 1:
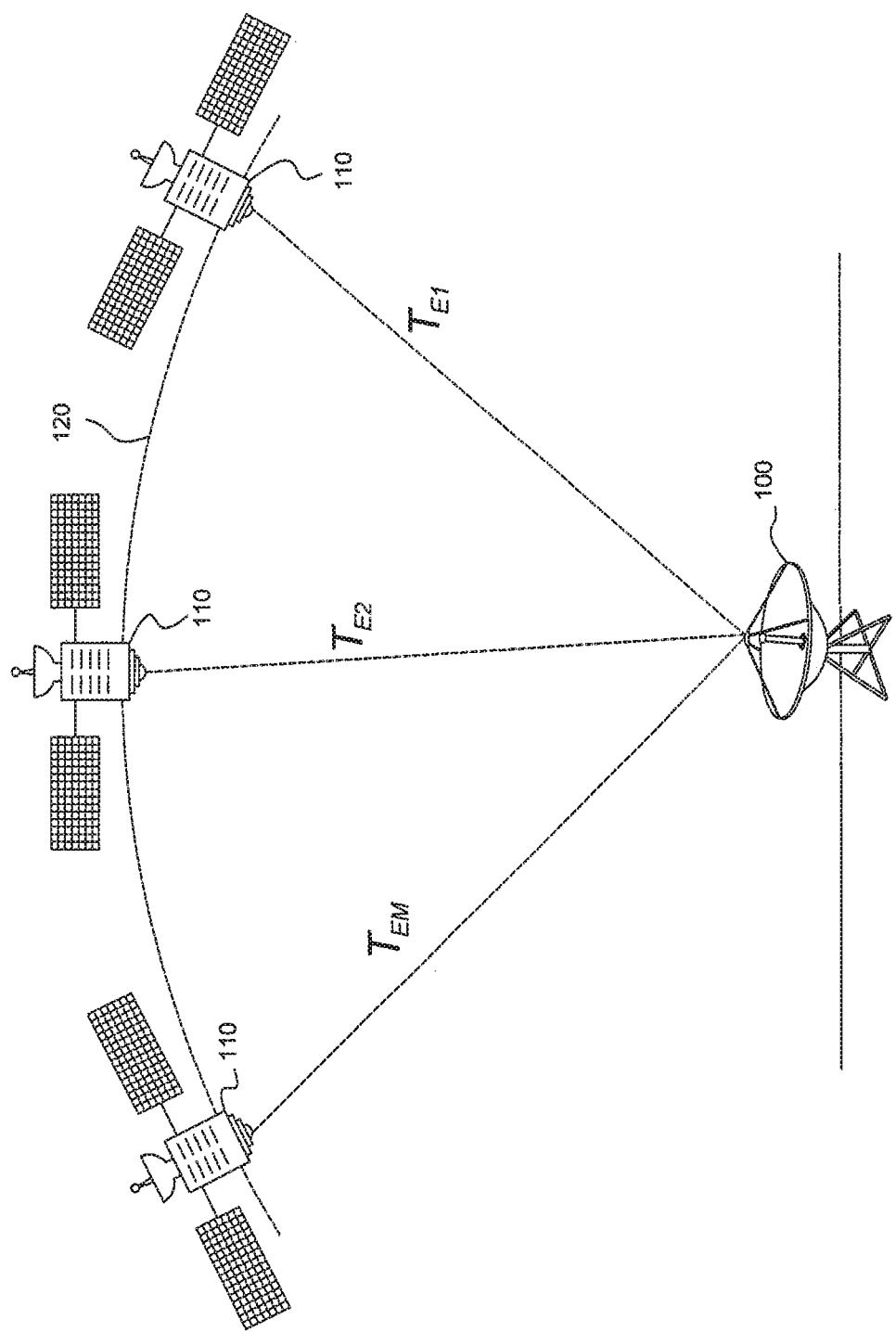
FIG. 1 is a simplified pictorial illustration of one embodiment of the present disclosure.

In one embodiment, the present disclosure determines the location (x,y,z) of a receiver (Rx) at time t using the time of arrival (TOA) of SoOPs transmitted from a satellite transmitter (Tx).

The time of arrival of a SoOP at the receiver is as follows:

$$toa_{Rx}(t,x,y,Z,T_{TxAmb}) = T_{prop}(t,T_{TxAmb},x,y,z) + T_{TxAmb} + T_{RxBias} + e_{sys}$$

$toa_{Rx}(t, x, y, Z, T_{TxAmb})$ is the expected time of arrival of a signal transmitted from an emitter to the receiver located at position x,y,z at time t, where the emitter has a time of transmission time ambiguity of $T_{TxAmb}$.

This equation is a function of:

$T_{prop}(t, T_{TxAmb}, x, y, z)$ is the signal propagation time between the satellite and the receiver at position x,y,z at time t, with a potentially ambiguous time shift of $T_{TxAmb}$. Due to the fact that the emitter is moving, the propagation time to the receiver changes as a function of time.

$T_{TxAmb}$ are time shifts and ambiguities that may exist in the transmitter with respect to a chosen time reference (i.e., GPS time), and include hardware and processing delays $\tau_{hw}$, in addition to intentional ambiguous time shift $\tau_{Amb}$ which is applied to each transmitter. In some spread spectrum-based satellite systems, intentional pseudo-noise sequence shifts are applied on a per-spot beam basis to provide orthogonality between beams, which appear as relative time shifts at the receiver that are largely orthogonal to each other.

$$T_{TxAmb} = \tau_{hw} + \tau_{Amb}$$

Errors $e_{sys}$ include measurement error due to thermal noise, multipath, processing inaccuracies, and in the case of satellites, atmospheric refraction due to propagation through the troposphere and ionosphere, and relativistic effects due to the earth's gravitational field.

In this embodiment, given time of arrival measurements from two or more unique satellites, it is possible to solve for the location of the receiver, which is further described below. In this embodiment, it is possible to directly solve for the range to each received satellite based on the estimated arrival time measurements, otherwise known as pseudo-ranges. Estimating the receiver location from multiple pseudo-range measurements has well known solutions due to its application in GPS positioning and other positioning technologies. For three dimensional positioning, it would be required that four satellites be received in order to solve for the four unknowns (x,y,z, and receiver clock bias).

In one embodiment, there may also exist a time ambiguity, which adds an additional variable which must be solved for as a function of each satellite used. This time ambiguity is not present in prior art systems that used GPS navigation since the receivers are time synchronized with the GPS. In one embodiment, an estimate of the emitter time ambiguity is needed in order to compute the one-way propagation range to the receiver, and to properly estimate the position of the satellite at a given time of day (since the satellites are in motion). Due to the orbital configuration of some LEO based networks, it is unlikely that more than three satellites are in view at the time same time, and usually this number is equal to two. However, due to the fact that the satellites are moving very quickly, the present disclosure takes advantage of this motion by making successive measurements on SoOPs received from the same quickly moving satellite and treating the signals as essentially being received from different unique satellites. As a result, a sufficient number of equations can be generated from only two satellites to solve for the unknowns over a period of time.

This concept has been successfully applied to synthetic aperture radar which relies on a moving baseline transceiver to provide high accuracy imaging. The longer the period of observation, the more physically separated the sources become (due to movement), which improves performance. Therefore, if two satellites were being used, it would be required to solve for 6 variables: (x,y,z, receiver clock bias, and the emitter time ambiguity at each satellite). In one embodiment, further reduction in the number of variables to solve for in a two satellite scenario is made possible if the user only desires to solve for two-dimensional position (x and y) and assume that the user is physically located on the surface of the earth or has some other means for determining altitude, such as a barometer. In addition, if the receiver is moving during this period of observation, this local relative motion can be compensated for through the use of dead reckoning sensors without negatively affecting performance.

Additional complexity reduction can be achieved if the user knows, or is able to pre-determine, the time of transmission of each measured burst from the satellites, which would resolve any possible time ambiguities.

The satellite transmitter times are critical for determining two inter-related items: 1) the time of transmission from which the measured signal was emanated from the satellite (needed to compute total propagation time and therefore range), and 2) the position of the satellite (which is highly dependent of the absolute time since the satellite is moving very quickly). In one embodiment, if it is not possible, or is impractical to provide an accurate transmitter offset for each satellite (and often for each spot beam within a satellite), it is possible to determine user position through an alternative means, which is described below.

In one embodiment, unambiguous position determination is performed using only two or more emitters moving at a high rate (in some cases this could be as high as several degrees in Azimuth per minute). Not only are the emitters moving, but due to their motion patterns combined with the shape of the earth, a set of ranges $T_{Em}$ (shown below) can be described that model the expected range between the mth emitter and the receiver.

With reference to FIG. 1, a receiver 100 can receive SoOPs from satellite 110. Satellite 110 can be in a low earth orbit 120. A series of ranges between receiver 100 and satellite 110 ($T_{E1}$, $T_{E2}$, $T_{Em}$) are illustrated as satellite 110 moves in its low earth orbit. Over time, this range vector can be modeled as a non-linear function which uniquely maps to a surface of position on the earth upon which the receiver must lie. If measurements are available from at least two emitters, then the intersection of these surfaces denotes the position of the receiver. It is also possible to map this to a three-dimensional solution through additional measurement sources such as an altimeter. $T_{Em}$ is described as following:

$$T_{Em} = \{\widehat{toa}_{Rx}(\tau_1), \widehat{toa}_{Rx}(\tau_2), \ldots \widehat{toa}_{Rx}(\tau_N)\}$$

Where $\widehat{toa}_{Rx}(\tau_n)$ is the maximum likelihood time of arrival estimate of particular segments of the received signal as determined by the following ambiguity function. Note that the replica signal is time-warped to factor in the expected relative motion that exists between the emitter and receiver, which may be non-negligible in the presence of fast-moving emitters, which differentiates this function from those used in traditional PNT applications.

$$\widehat{toa}_{Rx}(\tau_n) = \arg\max_{\tau} \left| \int_0^T s(t) \cdot g^*(\beta(t-\tau)) dt \right|$$

In the function above, s(t) is the received signal, and $g^*(\beta(t-\tau))$ is the conjugate of the expected received signal which has been time-warped by the function $\beta(t-\tau)$ to compensate for distortion that could occur over the entire integration period T. In many cases, this distortion is expressed as a time dilation or contraction that occurs due to the high rate of relative motion between the emitter and receiver. The time warping function must be constructed based on the expected relative movement between the emitter and transmitter over the known integration period. Due to the fact that generally the position and velocity of either the receiver (or the transmitter too), is not known, the time warping function used must span a range of possible dilation or contraction values. The best time of arrival is determined from the value of τ from which the ambiguity function is maximized over all τ and time warping functions β.

Figure 2A:
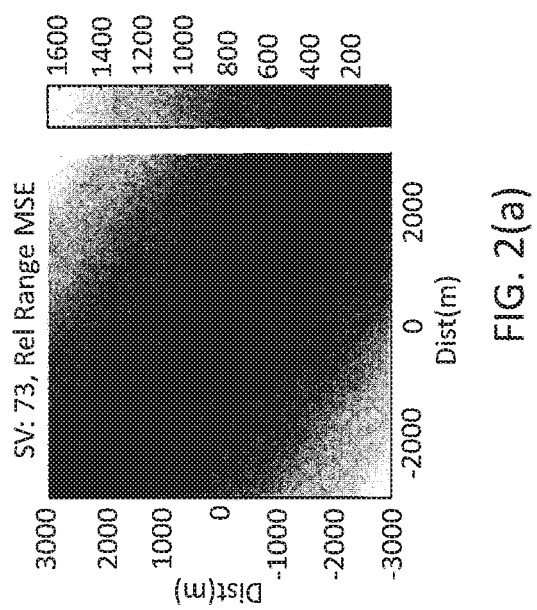
FIG. 2(*a*)-(*c*) is a simplified pictorial illustration of an embodiment of positioning determination of a receiver using two satellites.
Figure 2B:
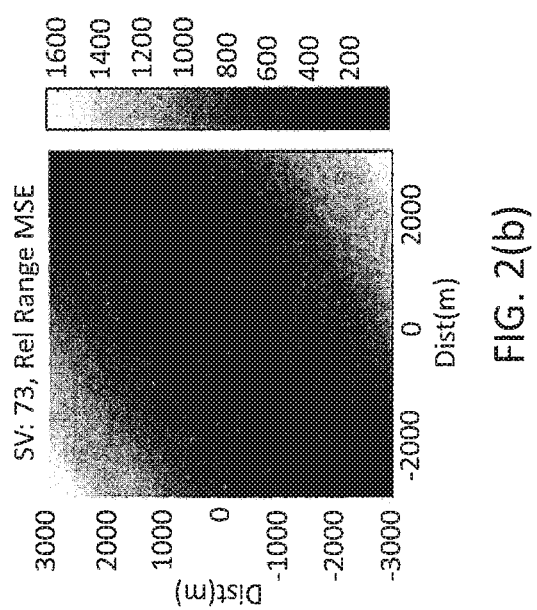
Figure 2C:
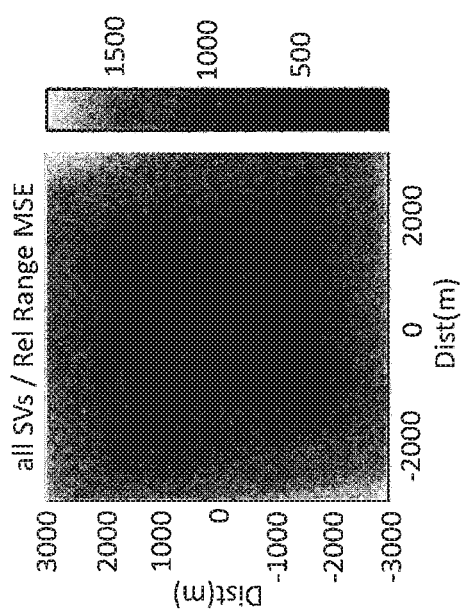

FIG. 2 is shows an example of positioning determination of a receiver using two satellites. The dark regions indicate surface areas of highest location probability vs. location in a 2-D Cartesian coordinate frame. FIG. 2(a) is for the first satellite, FIG. 2(b) is for the second satellite, and FIG. 2(c) is the combination of the two surfaces, clearly indicating that the highest likelihood location lies at the center of the plot.

Figure 3:
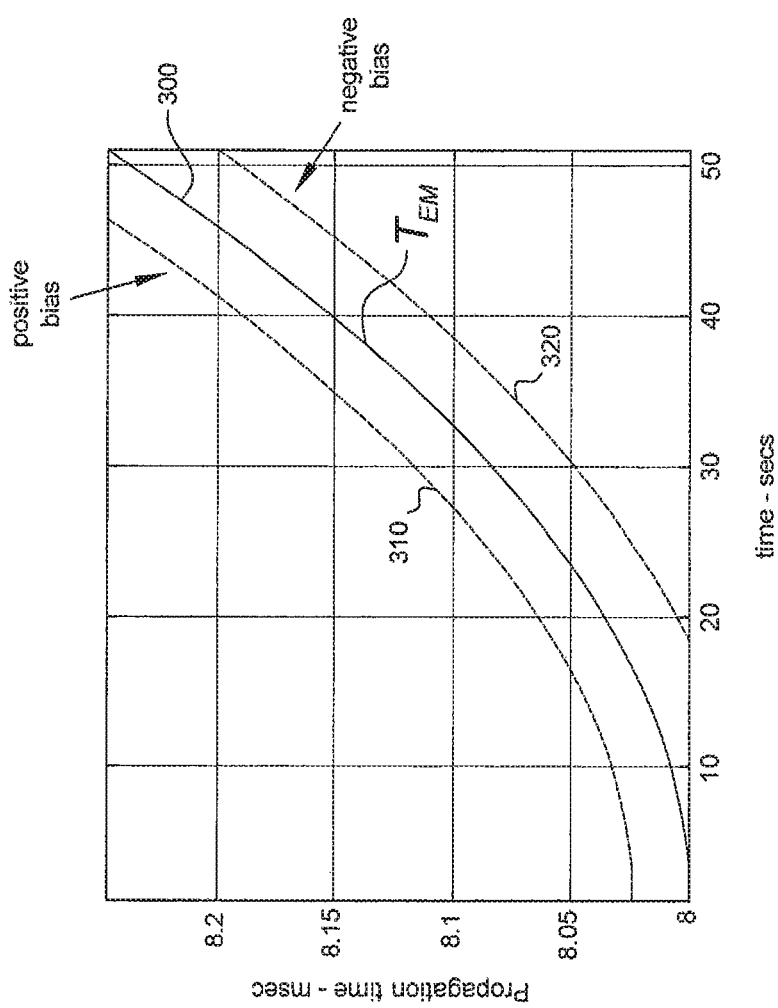
FIG. 3 is a simplified graph of a series of ranges between receiver 100 and satellite 110 of FIG. 1.

FIG. 3 below illustrates $T_{E1}$ for the expected propagation time vector between a satellite and a receiver. If perfect knowledge of the transmitter time existed, along with perfect knowledge of the satellite position over time, then the measured propagation time vector would match the shape of $T_{Em}$ 300 except it may be positively biased 310 or negatively biased 320 uniformly due to the unknown receiver clock bias.

Therefore, in the case of known emitter time ambiguity, the difference between an observed propagation time vector and the expected time vector is a constant value for all elements of the vector (due to the unknown receiver clock bias). This mismatch can be defined mathematically as the variance of the difference of the two vectors, which will be zero if they are identical:

$$tvar_m = \text{var}[T_{Em} - \hat{T}_{Em}]$$

Given M satellites being measured, the x and y receiver location (for a 2-dimensional solution) can be defined as being the point at which the function $f(x,y)$ is minimized, where $w_m$ is a weighting function that may be used to emphasize or de-emphasize the relative contribution of measurement sets. In one embodiment, $w_m$ can be based on parameters such as measurement noisiness, elevation angle, expected amount of multipath contribution, and the size of the measurement vector.

$$\min_{x,y} f(x, y) = \min_{x,y} \sum_{n=1}^{M} w_m \, tvar_m$$

$$\min_{x,y} f(x, y) = \min_{x,y} \sum_{n=1}^{M} w_m \, \text{var}[T_{Em} - \hat{T}_{Em}]$$

Numerous well known mathematical techniques for solving problems of this nature can be applied to compute the optimal solution, such as the Nelder-Meade downhill simplex numerical method.

Emitter Time Ambiguity

In the case of some satellite systems, time offsets are applied to each spot beam which have the effect of time shifting the transmitted signal. In other words, from the perspective of the receiver, this appears as an ambiguous time shift. Furthermore, there may be some additional time biases driven by processing and hardware delays in the satellites which may be unknown. Using the wrong emitter time shift term will result in the expected propagation time vector to be shifted in time, and would drive up the variance term $tvar_m$ even in the absence of any measurement error.

This would consequently impair the function minimization as described above, and result in a poor position estimate.

In order to take advantage of frequency reuse, some satellites transmit spot beams. A spot beam is a satellite signal that is specially concentrated in power, typically by using a high-gain antenna, so that it will cover only a limited geographic area on earth (thereby making the same frequency available for a spot beam directed to ta different geographic area.) Spot beams are used so that only earth stations in a particular intended reception area can properly receive the satellite signal.

If knowledge of which spot beam being received is not available, it is possible to estimate the time shift as some multiple of one of a fixed number of ambiguous time shift values, provided that (a) the receiver clock bias is significantly less than this ambiguous time amount and (b) that the position of the receiver is very coarsely known (on the order of hundreds of kilometers in most cases). Both of these conditions are easily met in most anticipated use cases. In the event that the emitter time ambiguity estimate is incorrect, this will be apparent due to the high variance that will be observed between the expected propagation time vector and the measured time vector.

In one embodiment, the present disclosure computes an estimate of receiver location by finding the position estimate which minimizes the weighted sum of the variances between observed and expected times of arrival over time, where the weighting is computed from the measurement quality of the signal and the number of measurements available, and expected times of arrival are computed as a function of each candidate geographic location and the estimated emitter time ambiguity.

In one embodiment weighting and filtering of the position estimates can also be estimated as a function of the relative dilution of precision that is expected to exist for a candidate solution. Dilution of precision can be driven by the relative azimuth angle differences between measured satellites. Optimal dilution of precision exists when measured satellites are 90 or 270 degrees apart.

Weighting and filtering of the position estimates can also be estimated as a function of the amount of measurement error that is expected to exist due to measurement noisiness, detection of multipath, or factors such as low elevation angle of the emitter which would subject the conditions to a higher amount of multipath due to the low grazing angle to the earth.

Through the use of the described location method, receiver clock biases on the order of several milliseconds or less have minimal impact on the performance of the system.

In another aspect, through the use of the present disclosure, the estimated solution improves as a function of the observation time.

In one embodiment, the present disclosure estimates the ambiguous emitter clock shift as one of a set of possible discrete values assigned to each emitter spot beam, as prescribed by the known signaling standard. A solution can be offered for cases where the ambiguous emitter clock shifts are provided to the receiver or are determined and then utilized in the navigation solution.

In the case of a satellite system which uses spot beams and each beam applies a different PN shift (which maps to a time delay), the PN shift could be estimated by the receiver based on a very coarse knowledge of the receiver location and the orientation (attitude) of the satellite with respect to the earth. This method to solve for the PN shift would provide an alternative to the previously described method which relies only on time measurements.

Unlike positioning methods which use range-rate measurements to derive position, this present disclosure is different. Range rate is the scalar measurement of the change in range with respect to a change in time, which can also be expressed as the relative velocity (i.e., the first derivative of position with respect to time). The solution described here computes position using a vector of range measurements in which each measurement is made at unique times. The change in range with respect to time is not directly considered in this solution. Rather, the solution is determined by minimizing the difference between the observed vector of ranges (or equivalently, time measurements) and the ranges that would be expected for each candidate geographic location.

In one embodiment, a long signal coherent integration can be utilized for several purposes. First, long signal coherent integration improves signal reception in obstructed RF conditions. It can also be used to determine unambiguous time alignment to the transmitted signal which is known to repeat at a much longer interval than signal propagation time. Through the use of extended coherent integration and narrow tracking filters, the present disclosure is able to measure and make use of signals from spot beams that are not optimally covering a geographic area. This has several benefits in that much longer observation periods can be formed which more uniquely map to smaller geographic locations (improves accuracy), and provides measurement redundancy in that measurements from multiple spot beams from the same satellite which can be combined to improve navigation performance and yield.

However, long signal coherent integration requires compensation due to the fact that the emitter is rapidly moving throughout the observation period, and if not addressed, would introduce additional position error. Compensation for this movement is carried out through the use of a time warping function within the ambiguity function.

As with most methods of using signals transmitted by satellites, SoOPs or otherwise, precision ephemeris information is necessary. However, for the present disclosure it does not necessarily have to come from the emitter operator or network. Any reliable database or measurement source could also provide this ephemeris data, provided that there is a means to produce high accuracy data (i.e., laser range finding, radar, optical telescopes, other ground-based dedicated equipment, etc.). Thus, the present disclosure can make use of externally provided satellite ephemeris data to predict the positions of each satellite over a period of time. Alternatively, this data could be directly provided over satellite links as well.

The present disclosure allows PNT determination using a single receiver node provided that the emitters have a common time source among all transmitters being measured (i.e., derived from GPS or some other common clock source), or if a separate measurement method is available to determine the underlying time alignment between emitters (generally done at a known physical location).

In one embodiment, the present disclosure uses an Extended Kalman Filter (or other state space estimator) to aid system performance in the cases of the receiver being in motion.

The present disclosure can also be used in conjunction with satellite navigation systems. For example, if GPS is available, the described solution provides a method to validate that the GPS derived position and time are valid through this independently derived solution. In addition, the validity of received non-GNSS satellite signals can be confirmed by simultaneously (or near-simultaneously) observing the known gateway to the satellite (in a bent-pipe architecture), which are known to be repeated on a separate frequency for the purpose of relaying the ground station to satellite signals. Nearly identical signals (other than the band of operation) should be present on both links. A collaborative navigation solution (non-stand-alone) is possible if a known-location receiver is able to independently derive information such as the emitter time ambiguity and forward this data to receivers who are attempting to navigate. This data could be communicated through a separate signaling scheme, or even carried over the communications network that is being used for navigation.

The present disclosure can also be used to perform a one-time (or very infrequent) calibration of the processing and hardware delays of each emitter by observing timing characteristics over a period of time through a prolonged observation from known locations. A complete characterization, or calibration, of emitter-unique time delay properties could be made available to receivers for increased navigation performance.

The methods and techniques described above can simultaneously measure and combine detections from the same satellite which is transmitting on multiple spot beams, PN codes, and frequencies to improve navigation performance and yield. Uses as few as 2 emitter signals to perform navigation by exploiting relative motion that exists between the transmitters and the receiver, creating a synthetic aperture.

In addition to spread spectrum/code division multiple access (CDMA) type SoOPs where PN offset and different codes may be used for diversity and multiple access, disclosed methods can be applied to frequency division and time division multiple access (FDMA/TDMA) type SoOPs.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims Embodiments of the subject matter and the functional operations described in this specification can be implemented in digital electronic circuitry, or in computer software, firmware, or hardware, including the structures disclosed in this specification and their structural equivalents, or in combinations of one or more of them.

Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, a composition of matter affecting a machine-readable propagated signal, or a combination of one or more of them.

The term "circuitry" encompasses all apparatus, devices, and machines for processing data, including by way of example a programmable processor, a computer, or multiple processors or computers. The circuitry can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed:

1. A method for determining the location of a receiver:
   a. receiving at a receiver:
      i. receiving a signal of Opportunity (SoOP) from a first satellite at a first time;
      ii. receiving a SoOP from a first satellite at a second time;
      iii. receiving a SoOP from a second satellite at a third time;
      iv. receiving a SoOP from a second satellite at a fourth time;
   b. determining a location of the receiver based on each received SoOP from the first and second satellite and an expected time of arrival based on the expected relative movement between each satellite and the receiver;

wherein the received SoOPs are emissions meant for applications other than position/navigation/time (PNT) estimation.

2. The method of claim 1 wherein the first and second satellites are in low earth orbit.

3. The method of claim 1 wherein the step of determining a location of the receiver uses a maximum likelihood time of arrival estimate of the SoOPs received from the first and second satellite.

4. The method of claim 1 further comprising the step of computing an expected time of arrival of the SoOPs at the receiver.

5. The method of claim 1 wherein the step of determining the location of the receiver uses a time warp factor based on the expected movement between the first satellite and the receiver.

6. A method for determining the location of a receiver:
   a. receiving at a receiver:
      i. receiving a signal of Opportunity (SoOP) from a first satellite at a first time;
      ii. receiving a SoOP from a first satellite at a second time;
      iii. receiving a SoOP from a second satellite at a third time;
      iv. receiving a SoOP from a second satellite at a fourth time;
   b. determining a location of the receiver based on each received SoOP from the first and second satellite and an expected time of arrival based on the expected relative movement between each satellite and the receiver;
   c. computing an expected time of arrival of the SoOPs at the receiver;
   wherein the step of determining a location of the receiver uses a weighted sum of the variances between the received SoOPs from the first and second satellites and expected times of arrival of the SoOPs.

7. The method of claim 6 wherein the weighted sum is computed as a function of a measurement quality of the SoOPs and the number of measurements available.

8. The method of claim 6 wherein the expected times of arrival of the SoOPs are computed as a function of a candidate geographic location of the receiver and an estimated emitter time ambiguity of the transmitting satellite.

9. The method of claim 8 wherein the received SoOPs are spot beams and the estimated emitter time ambiguity is estimated from a PN shift associated with the spot beams.

10. The method of claim 9 wherein the PN shift associated with the spot beams is estimated by the receiver based on a coarse estimation of the location of the receiver and an orientation of the transmitting satellite with respect to the earth.

11. A system for determining the location of a receiver, comprising:
    a receiver, comprising:
      a memory for storing computer readable code;
      a processor operatively coupled to the memory, the processor configured to:
        receive a signal of Opportunity (SoOP) from a first satellite at a first time;
        receive a SoOP from a first satellite at a second time;
        receive a SoOP from a second satellite at a third time;
        receive a SoOP from a second satellite at a fourth time;
        determine a location of the receiver based on each received SoOP from the first and second satellite and an expected time of arrival based on the expected relative movement between each satellite and the receiver; and wherein the received SoOPs are emissions meant for applications other than position/navigation/time (PNT) estimation.

12. The system of claim 11 wherein the first and second satellites are in low earth orbit.

13. The system of claim 11 wherein the processor is further configured to determine a location of the receiver uses a maximum likelihood time of arrival estimate of the SoOPs received from the first and second satellite.

14. The system of claim 11 wherein the processor is further configured to compute an expected time of arrival of the SoOPs at the receiver.

15. The system of claim 11 wherein the processor is further configured to determine the location of the receiver using a time warp factor based on the expected movement between the first satellite and the receiver.

16. A system for determining the location of a receiver, comprising:
 a receiver, comprising:
  a memory for storing computer readable code;
  a processor operatively coupled to the memory, the processor configured to:
   receive a signal of Opportunity (SoOP) from a first satellite at a first time;
   receive a SoOP from a first satellite at a second time;
   receive a SoOP from a second satellite at a third time;
   receive a SoOP from a second satellite at a fourth time;
   determine a location of the receiver based on each received SoOP from the first and second satellite and an expected time of arrival based on the expected relative movement between each satellite and the receiver; and
  wherein the processor is further configured to use a weighted sum of the variances between the received SoOPs from the first and second satellites and expected times of arrival of the SoOPs.

17. The system of claim 16 wherein the weighted sum is computed as a function of a measurement quality of the SoOPs and the number of measurements available.

18. The system of claim 16 wherein the expected times of arrival of the SoOPs are computed as a function of a candidate geographic location of the receiver and an estimated emitter time ambiguity of the transmitting satellite.

19. The system of claim 18 wherein the received SoOps are spot beams and the estimated emitter time ambiguity is estimated from a PN shift associated with the spot beams.

20. The system of claim 19 wherein the PN shift associated with the spot beams is estimated by the processor based on a coarse estimation of the location of the receiver and an orientation of the transmitting satellite with respect to the earth.

* * * * *